United States Patent
Jang et al.

(10) Patent No.: US 6,471,800 B2
(45) Date of Patent: Oct. 29, 2002

(54) LAYER-ADDITIVE METHOD AND APPARATUS FOR FREEFORM FABRICATION OF 3-D OBJECTS

(75) Inventors: Bor Z. Jang, Auburn, AL (US); Erjian Ma, Auburn, AL (US)

(73) Assignee: Nanotek Instruments, Inc., Opelika, AL (US)

( * ) Notice: Subject to any disclaimer, the term of this patent is extended or adjusted under 35 U.S.C. 154(b) by 134 days.

(21) Appl. No.: 09/726,185

(22) Filed: Nov. 29, 2000

(65) Prior Publication Data

US 2002/0062909 A1 May 30, 2002

(51) Int. Cl.$^7$ ............................................. B32B 31/00
(52) U.S. Cl. ...................... 156/58; 156/155; 156/305; 156/307.3; 156/390; 156/538; 156/578
(58) Field of Search ..................... 156/58, 155, 305, 156/307.1, 307.3, 390, 538, 578; 264/401; 427/256

(56) References Cited

U.S. PATENT DOCUMENTS

| | | |
|---|---|---|
| 4,752,352 A | 6/1988 | Feygin |
| 4,863,538 A | 9/1989 | Deckard |
| 5,088,047 A | 2/1992 | Bynum |
| 5,121,329 A | 6/1992 | Crump |
| 5,174,843 A | 12/1992 | Natter |
| 5,183,598 A | 2/1993 | Helle et al. |
| 5,204,055 A | 4/1993 | Sachs et al. |
| 5,301,863 A | 4/1994 | Prinz et al. |
| 5,352,310 A | 10/1994 | Natter |
| 5,354,414 A | 10/1994 | Feygin |
| 5,514,232 A | 5/1996 | Burns |
| 5,593,531 A | 1/1997 | Penn |
| 5,637,175 A | 6/1997 | Feygin et al. |

Primary Examiner—Michael W. Ball
Assistant Examiner—John T. Haran (57) ABSTRACT

A method and apparatus for fabricating a three-dimensional object from porous solid preform layers and at least a pore-filling material. The method includes: (a) providing a work surface parallel to an X–Y plane of a Cartesian coordinate system; (b) feeding a first porous solid preform layer to the work surface; (c) using dispensing devices to dispense a first pore-filling material onto predetermined areas of the first preform layer to at least partially fill in the pores in these areas (hardened areas) for forming the first section of the object; (d) feeding a second porous preform layer onto the first layer, dispensing a second pore-filling material onto predetermined areas of the second layer for forming the second section (the second pore-filling material being the same as or different than the first); (e) repeating the operations from (b) to (d) to stack up and build successive preform layers along the Z-direction for forming multiple layers of the object with the remaining un-hardened areas of individual layers staying as a support structure; (f) sequentially or simultaneously affix successive layers together to form a unitary body; and (g) removing the support structure by exposing the un-hardened areas of the unitary body to a support-collapsing environment, causing the 3-D object to appear.

25 Claims, 3 Drawing Sheets

LAYER-ADDITIVE METHOD AND APPARATUS FOR FREEFORM FABRICATION OF 3-D OBJECTS

FIELD OF THE INVENTION

This invention relates generally to a computer-controlled method and apparatus for fabricating a three-dimensional (3-D) object and, in particular, to an improved method and apparatus for building a 3-D object directly from a computer-aided design of the object in a layer-by-layer fashion.

BACKGROUND OF THE INVENTION

Solid freeform fabrication (SFF) or layer manufacturing (LM) is a new fabrication technology that builds an object of any complex shape layer by layer or point by point without using a pre-shaped tool (die or mold). This process begins with creating a Computer Aided Design (CAD) file to represent the geometry or drawing of a desired object. As a common practice, this CAD file is converted to a stereo lithography (.STL) format in which the exterior and interior surfaces of the object is approximated by a large number of triangular facets that are connected in a vertex-to-vertex manner. A triangular facet is represented by three vertex points each having three coordinate points: $(x_1,y_1,z_1)$, $(x_2,y_2,z_2)$, and $(x_3,y_3,z_3)$. A perpendicular unit vector $(i,j,k)$ is also attached to each triangular facet to represent its normal for helping to differentiate between an exterior and an interior surface. This object image file is further sliced into a large number of thin layers with the contours of each layer being defined by a plurality of line segments connected to form polylines on an X–Y plane of a X-Y-Z orthogonal coordinate system. The layer data are converted to tool path data normally in terms of computer numerical control (CNC) codes such as G-codes and M-codes. These codes are then utilized to drive a fabrication tool for defining the desired areas of individual layers and stacking up the object layer by layer along the Z-direction.

This SFF technology enables direct translation of the CAD image data into a three-dimensional (3-D) object. The technology has enjoyed a broad array of applications such as verifying CAD database, evaluating design feasibility, testing part functionality, assessing aesthetics, checking ergonomics of design, aiding in tool and fixture design, creating conceptual models and sales/marketing tools, generating patterns for investment casting, reducing or eliminating engineering changes in production, and providing small production runs.

The SFF techniques may be divided into three major categories: layer-additive, layer-subtractive, and hybrid (combined layer-additive and subtractive). A layer additive process involves adding or depositing a material to form predetermined areas of a layer essentially point by point; but a multiplicity of points may be deposited at the same time in some techniques, such as of the multiple-nozzle inkjet-printing type. These predetermined areas together constitute a thin section of a 3-D object as defined by a CAD geometry. Successive layers are then deposited in a predetermined sequence with a layer being affixed to its adjacent layers for forming an integral 3-D, multi-layer object. A 3-D object, when sliced into a plurality of constituent layers or thin sections, may contain features that are not self-supporting and in need of a support structure during the object-building procedure. These features include isolated islands in a layer and overhangs. In these situations, additional steps of building the support structure, also on a layer-by-layer basis, will be required of a layer-additive technique. An example of a layer-additive technique is the fused deposition modeling (FDM) process as specified in U.S. Pat. No. 5,121,329 (issued on Jun. 9, 1992 to S. S. Crump).

A layer-subtractive process involves feeding a complete solid layer to the surface of a support platform and using a cutting tool (normally a laser) to cut off or somehow degrade the integrity of the un-wanted areas of this solid layer. The solid material in these un-wanted areas of a layer becomes a part of the support structure for subsequent layers. These un-wanted areas are hereinafter referred to as the "negative region" while the remaining areas that constitute a section of a 3-D object are referred to as the "positive region". A second solid layer is then fed onto the first layer and bonded thereto. The same cutting tool is then used to cut off or degrade the material in the negative region of this second layer. These procedures are repeated successively until multiple layers are laminated to form a unitary object. After all layers have been completed, the unitary body (part block) is removed from the platform, and the excess material (in the negative regions) is removed to reveal the 3-D object. This "decubing" procedure is known to be tedious and difficult to accomplish without damaging the object. An example of a layer subtractive technique is the well-known laminated object manufacturing (LOM), disclosed in U.S. Pat. No. 4,752,352 (Jun. 21, 1988 to M. Feygin), U.S. Pat. No. 5,354,414 (Oct. 11, 1994 to M. Feygin) and U.S. Pat. No. 5,637,175 (Jun. 10, 1997 to M. Feygin, et al).

A hybrid process involves both layer-additive and subtractive procedures. An example can be found with the Shape Deposition Manufacturing (SDM) process disclosed in U.S. Pat. No. 5,301,863 issued on Apr. 12, 1994 to Prinz and Weiss. The SDM-based fabrication system contains a material deposition station and a plurality of processing stations (for mask making, heat treating, packaging, complementary material deposition, shot peening, cleaning, shaping, sand-blasting, and inspection). The combined deposition-shaping procedures qualify the SDM as a hybrid layer manufacturing technique. In the SDM system, each processing station performs a separate function such that when the functions are performed in series, a layer of an object is produced and is prepared for the deposition of the next layer. This system requires an article transfer apparatus, a robot arm, to repetitively move the object-supporting platform and any layers formed thereon out of the deposition station into one or more of the processing stations before returning to the deposition station for building the next layer. These additional operations in the processing stations tend to shift the relative position of the object with respect to the object platform. Further, the transfer apparatus may not precisely bring the object to its exact previous position. Hence, the subsequent layer may be deposited on an incorrect spot, thereby compromising part accuracy. The more processing stations that the growing object has to go through, the higher the chances are for the part accuracy to be lost. Such a complex and complicated process necessarily makes the over-all fabrication equipment bulky, heavy, expensive, and difficult to maintain. The equipment also requires attended operation.

Another good example of layer-additive techniques is the 3-D printing technique (3D–P) developed at MIT; e.g., U.S. Pat. No. 5,204,055 (April 1993 to Sachs, et al.). This 3-D powder printing technique involves dispensing a layer of loose powders onto a support platform and using an ink jet to spray a computer-defined pattern of liquid binder onto a layer of uniform-composition powder. The binder serves to bond together those powder particles on those areas defined by this pattern. Those powder particles in the un-wanted regions remain loose or separated from one another and are removed at the end of the build process. Another layer of powder is spread over the preceding one, and the process is repeated. The "green" part made up of those bonded powder particles is separated from the loose powders when the process is completed. This procedure is followed by binder removal and the impregnation of the green part with a liquid material such as epoxy resin and metal melt. The loose powders tend to create a big mess inside the fabrication machine and adjacent areas. Such a machine may not be very suitable for use in an office environment.

This same drawback is true of the selected laser sintering or SLS technique (e.g., U.S. Pat. No. 4,863,538, Sep. 5, 1989 to C. Deckard) that involves spreading a full-layer of loose powder particles and uses a computer-controlled, high-power laser to partially melt these particles at predetermined spots. Commonly used powders include thermoplastic particles or thermoplastic-coated metal and ceramic particles. The procedures are repeated for subsequent layers, one layer at a time, according to the CAD data of the sliced-part geometry. The loose powder particles in each layer are allowed to stay as part of a support structure. The sintering process does not always fully melt the powder, but allows molten material to bridge between particles. Commercially available systems based on SLS are known to have several drawbacks. One problem is that long times are required to heat up and cool down the material chamber after building. The need to use a high power laser makes the SLS an expensive technique and unsuitable for use in an office environment.

In U.S. Pat. No. 5,514,232, issued May 7, 1996, Burns discloses a method and apparatus for automatic fabrication of a 3-D object from individual layers of fabrication material having a predetermined configuration. Each layer of fabrication material is first deposited on a carrier substrate in a deposition station. The fabrication material along with the substrate are then transferred to a stacker station. At this stacker station the individual layers are stacked together, with successive layers being affixed to each other and the substrate being removed after affixation. One advantage of this method is that the deposition station may permit deposition of layers with variable colors or material compositions. In real practice, however, transferring a delicate, not fully consolidated layer from one station to another would tend to shift the layer position and distort the layer shape. The removal of individual layers from their substrate also tends to inflict changes in layer shape and position with respect to a previous layer, leading to inaccuracy in the resulting part.

Lamination-based layer manufacturing (LM) techniques that involve transferring thin sections of a solid or powders are also disclosed in U.S. Pat. No. 5,088,047 (Feb. 11, 1992 to D. Bynun) and U.S. Pat. No. 5,593,531 (Jan. 14, 1997 to S. M. Penn). Lamination-based LM techniques that require radiation curing of solid sheet materials layer by layer can be found in U.S. Pat. No. 5,174,843 (Dec. 29, 1992 to M. Natter), U.S. Pat. No. 5,352,310 (Oct. 4, 1994 to M. Natter), and U.S. Pat. No. 5,183,598 (Feb. 2, 1993 to J–L Helle, et al.). Disclosed in this latter patent (U.S. Pat. No. 5,183,598) is a process that includes preparing thin non-porous sheets of a fiber- or screen-reinforced matrix material. In these composite sheets, the matrix material exhibits the feature that its solubility in a specific solvent can be changed when the material is exposed to a specific radiation. Selected areas of individual sheets are radiated to reduce the solubility. The un-irradiated portion (the negative region) of individual layers remains soluble in the solvent. The stack of sheets are affixed together to form an integral body, which is immersed in the solvent that causes the desired object to appear. This process exhibits the following shortcomings:

1). A solvent is used, which can pose a health hazard.
2). A radiation source (e.g., a laser beam) is required. High energy radiation sources and their handling equipment (for reflecting, focusing, etc) are expensive. Furthermore, they are not welcome in an office environment.
3). It is difficult for a radiation to penetrate a solid sheet with an embedded screen or fibers. These reinforcement fibers or screen would tend to scatter or absorb the imposing radiation, making the solubility changes in the matrix material non-homogeneous. In particular, the material near the bottom of a sheet, opposite the radiation source, may not be properly cured and can remain soluble at the end of the layer-stacking procedure. When immersed in a solvent, this under-cured portion of the material would be dissolved, leaving behind a disintegrated structure.
4). This process makes use of uniform-composition sheets of solid materials and, hence, is not amenable to the fabrication of layers with material compositions varying from point to point and from layer to layer. For instance, this process does not allow for the fabrication of a multi-color object in which a different layer has a different color or a different portion of a layer has a different color pattern.
5). When a screen is used as the reinforcement, the screen in the negative region is difficult to get dissolved in the solvent particularly if this screen is made of metal or ceramic materials. A strong acid is needed in dissolving a metal screen, as suggested in U.S. Pat. No. 5,183,598.

Due to the specific solidification mechanisms employed, many LM techniques are limited to producing parts from specific polymers. For instance, Stereo Lithography and Solid Ground Curing (SGC) rely on ultraviolet (UV) light induced curing of photo-curable polymers such as acrylate and epoxy resins.

The above discussion has indicated that all prior-art layer manufacturing techniques have serious drawbacks that have prevented them from being widely implemented.

Therefore, an object of the present invention is to provide an improved layer-additive method and apparatus for producing a 3-D object in an office environment.

Another object of the present invention is to provide a computer-controlled method and apparatus for producing a multi-material or multi-color part on a layer-by-layer basis.

It is a further object of this invention to provide a computer-controlled composite building method that does not require heavy and expensive equipment.

It is another object of this invention to provide a method and apparatus for building a CAD-defined object in which the support structure is readily provided during the layer-adding procedure and is easily removed at the completion of this procedure.

Still another object of this invention is to provide a layer manufacturing technique that places minimal constraint on the range of materials that can be used in the fabrication of a 3-D object.

SUMMARY OF THE INVENTION

The Method

The objects of the invention are realized by a method and related apparatus for fabricating a three-dimensional object on a layer-by-layer basis. Basically, the method includes, in combination, the following steps:

(a) setting up a work surface that lies substantially parallel to an X–Y plane of an X-Y-Z Cartesian coordinate system defined by three mutually orthogonal X-, Y- and Z-axes;

(b) feeding a first porous solid preform layer to the work surface; the pore content being preferably in the range of 30% to 70% and further preferably in the range of 40–60%;

(c) using dispensing devices to dispense a first pore-filling material onto predetermined areas of the first porous preform layer to at least partially fill in pores in these predetermined areas for the purpose of hardening these areas and forming the first section of the 3-D object; these predetermined areas, in combination, constituting the geometry of this first section and are referred to collectively as the "positive region";

(d) feeding a second porous preform layer onto the first layer, dispensing a second pore-filling material onto predetermined areas of the second layer for hardening these areas and forming the second section of the 3-D object;

(e) repeating the operations from (b) to (d) to stack up successive preform layers along the Z-direction of the X-Y-Z coordinate system for forming multiple layers of the object with the remaining un-hardened areas (negative region) of individual layers staying as a support structure;

(f) providing means to sequentially or simultaneously affix successive layers together to form a unitary body; and (g) removing the support structure by exposing the un-hardened areas of this unitary body to a support-collapsing environment, causing the 3-D object to appear.

In this method, the porous solid preform layers may contain a reinforcement composition selected from the group consisting of short fiber, long fiber, whisker, spherical particle, ellipsoidal particle, flake, small platelet, small ribbon, disc, particulate of any other shape, or a combination thereof. In this method, the porous preform layers preferably comprise a watersoluble material composition and the support-collapsing environment comprises water. Specifically, individual short fibers and/or reinforcement particles may be bonded together at their points of contact by a water soluble glue (e.g., polyvinyl alcohol-based glue), leaving behind pores interspersed with those fibers or particles. These otherwise isolated fibers and particles, when glued together, will make a porous solid layer that is rigid enough to be handled by the preform feeder in the invented fabricator apparatus. In the predetermined areas (positive region), the fibers and particles are coated, covered, or otherwise protected by the deposited pore-filling materials. The material in this positive region will remain essentially intact while the fibers/particles in the support structure or negative region will be separated/isolated due to the glue being dissolved in water. This step will allow the support structure to collapse, thereby revealing the desired 3-D object.

Alternatively, the support structure may be made to contain a material composition with a melting point lower than the melting or decomposition temperature of the hardened areas (positive region). In this case, the unitary body may be subjected to a support-collapsing temperature (Tsc) higher than the melting point of this glue material (e.g., poly ethylene oxide with a $T_m=63°$ C.) and lower than either the melting point of the pore-filling material (e.g., polyethylene with a $T_m=130°$ C.) or the degradation temperature of a cured thermoset resin (e.g., much higher than 250° C. for epoxy). In this manner, the support-collapsing environment comprises a high temperature environment to melt out the low-melting composition (glue) for readily collapsing the support structure to reveal the 3-D structure.

There are available many thermosetting resins which, upon curing, harden the preform layers. Examples are epoxy, un-saturated polyester, phenolic, and polyimide resins. There are also a wide range of thermoplastic materials that can be chosen from for use as a pore-filling material. These materials may be heated above their glass transition temperatures, $T_g$ (if they are amorphous polymers such as polystyrene, poly carbonate, and acrylonitrile-butadine-styrene or ABS) or their melting points, $T_m$ (if they are semi-crystalline polymers such as polypropylene and nylon). These thermoplastic melts can then be dispensed and deposited to partially fill the pores to coat, cover, or protect the underling fibers/particles. These melts, upon cooling below their $T_g$ or $T_m$, will solidify and harden the preform layers. Although not a preferred approach, a thermoplastic polymer may be dissolved in a solvent to form a solution. This solution may be dispensed and deposited as a pore-filling material. Once, the solvent is removed (e.g., under the action of a ventilation system), the polymer will precipitate out to cover, coat, or protect the fibers/particles and harden the preform layers.

The porous preform layers may be made to contain a hardenable ingredient (e.g., an epoxy resin) and the pore-filling material comprises a chemical composition (e.g., a curing agent) which reacts with this ingredient to form a solid product (e.g., a cross-linked or cured resin) for hardening the preform layers. A wide range of such two-part resins are available commercially.

In the presently invented method, the dispensing means may be selected from the group of devices consisting of an inkjet printhead, gear pump, positive displacement pump, air pump, metering pump, extrusion screw, solenoid valve, thermal sprayer, and combinations thereof. The dispensing devices may be equipped with multiple nozzles or multiple discharge orifices for dispensing a plurality of material compositions.

A convenient way of feeding preform layers one sheet at a time is using a mechanism involving motor-driven rollers that are commonly used in a copier, fax machine, graphic plotter, or desk-top printer.

The operation of using dispensing means to dispense a pore-filling material onto predetermined areas of a porous preform layer preferably include the steps of (1) positioning the dispensing means at a predetermined initial distance from the work surface; (2) operating and moving the dispensing means relative to the work surface along selected directions in the X–Y plane to dispense and deposit the pore-filling material to the predetermined areas; (3) moving the dispensing means away from the work surface along the Z-axis direction by a predetermined distance to allow for the building of a subsequent layer. The movement of the dispensing devices relative to the work surface may be carried out by using any motor-driven linear motion devices, gantry table, or robotic arms which are all widely available commercially.

The moving and dispensing operations of the dispensing means are preferably conducted under the control of a computer. This can be accomplished by (1) first creating a geometry of the three-dimensional object on a computer with the geometry including a plurality of data points defining the object (a procedure equivalent to computer-aided design), (2) generating programmed signals corresponding to each of the data points in a predetermined sequence; and (3) moving the dispensing means and the work surface relative to each other in response to these programmed signals. These signals may be prescribed in accordance with the G-codes and M-codes that are commonly used in computer numerical control (CNC) machinery industry.

In order to produce a multi-material 3-D object in which the material composition or color can vary from point to point, the presently invented method may further comprise the steps of (1) creating a geometry of the 3-D object on a computer with the geometry including a plurality of data points defining the object; each of the data points being coded with a selected material composition, (2) generating programmed signals corresponding to each of the data points in a predetermined sequence; and (3) operating the dispensing means in response to the programmed signals to dispense and deposit selected material compositions while the dispensing means and the work surface are moved relative to each other in response to these programmed signals in the predetermined sequence.

To further ensure the part accuracy and compensate for the potential variations in part dimensions (thickness, in particular), the present method may be executed under the assistance of dimension sensors. These sensors may be used to periodically measure the dimensions of the object being built while a computer is used to determine the thickness and outline of individual layers intermittently in accordance with a computer aided design representation of the object. The computing step includes operating the computer to calculate a first set of logical layers with specific thickness and outline for each layer and then periodically re-calculate another set of logical layers after periodically comparing the dimension data acquired by the sensor with the computer aided design representation in an adaptive manner.

The Apparatus

Another embodiment of this invention is a solid freeform fabrication apparatus for automated fabrication of a 3-D object. This apparatus includes: (a) a work surface to support the object while being built; (b) a feeder for feeding successive porous solid preform layers onto the work surface one layer at a time; (c) dispensing devices for dispensing at least a pore-filling material onto the porous solid preform layers; (d) motion devices coupled to the work surface and the dispensing devices for moving the dispensing devices and the work surface relative to each other in a plane defined by the X- and Y-directions and in the Z direction orthogonal to the X–Y plane in an X-Y-Z coordinate system to dispense at least a pore-filling material onto the porous preform layers for forming this 3-D object.

In this apparatus, the dispensing devices may include a device selected from the group consisting of an ink jet print-head with thermally activated actuator means, an ink jet print-head with piezo-electrically activated actuator means, an air gun with compressed air-powered actuator means, a gear pump, a positive displacement pump, a metering pump, an extrusion screw, a solenoid valve, and a thermal sprayer. The function of such a device is to deliver, on demand, droplets or strands of a solidifying liquid to enter the pores in selected areas of a preform layer; these selected areas defining a cross section of the 3-D object being built. A dispensing device may feature a plurality of nozzles each with at least one discharge orifice of a predetermined size for dispensing at least one pore-filling material. When a multiplicity of materials is dispensed and deposited, a multi-material or composite object is built.

Preferably, the apparatus further includes a consolidating device (e.g., a heated roller) coupled to the motion devices for compacting, hardening, or consolidating the preform layers along with the dispensed pore-filling material. Once a new layer of preform is fed into the build zone above the work surface, a heated roller may be activated to roll over this new layer to help affix this layer to a preceding layer. Alternatively, the roller may be used intermittently after a selected number of layers are stacked up together to help consolidate these layers.

In order to automate the object-fabricating process, the present apparatus is equipped with a computer-aided design computer and supporting software programs operative to (a) create a three-dimensional geometry of the 3-D object, (b) convert this geometry into a plurality of data points defining the object, and (c) generate programmed signals corresponding to each of the data points in a predetermined sequence. The apparatus also includes a three-dimensional motion controller electronically linked to the computer and the motion devices. The motion controller is operated to actuate the motion devices in response to the programmed signals for each of the data points received from the computer.

The apparatus preferably includes dimension sensors that are electronically linked to the computer. The sensors periodically provide layer dimension data to the computer. In the mean time, the supporting software programs in the computer act to perform adaptive layer slicing to periodically create a new set of layer data, including the data points defining the object, in accordance with the layer dimension data acquired by the sensors means. New sets of programmed signals corresponding to each of the new data points are generated in a predetermined sequence.

The object-supporting work surface or platform is generally flat and is located at a predetermined initial distance from (but in close, working proximity to) the discharge orifices of the dispensing devices to receive discharged materials therefrom. The motion devices are coupled to the work surface and the dispensing devices for moving the dispensing devices and the work surface relative to each other in an X–Y plane defined by first and second directions (X- and Y-directions) and in a third direction (Z-direction) orthogonal to the X–Y plane to deposit the pore-filling materials to form a 3-D object. The motion devices are preferably controlled by a computer system for positioning the dispensing devices with respect to the platform in accordance with a CAD-generated data file representing the object. Further preferably, the same computer is used to regulate the operations of the material dispensing devices in such a fashion that pore-filling materials are dispensed in predetermined sequences with predetermined proportions at predetermined rates.

Specifically, the motion devices are responsive to a CAD-defined data file which is created to represent the 3-D preform shape to be built. A geometry (drawing) of the object is first created in a CAD computer. The geometry is then sectioned into a desired number of layers with each layer being comprised of a plurality of data points. These layer data are then converted to machine control languages that can be used to drive the operation of the motion devices and dispensing devices. These motion devices operate to provide relative translational motion of the material dispensing devices with respect to the work surface in a horizontal direction within the X–Y plane. The motion devices further provide relative movements vertically in the Z-direction, each time by a predetermined layer thickness.

The chemical compositions in the pore-filling materials may be comprised of, but is not limited to, the following materials including various adhesives, waxes, solutions containing a thermoplastic polymer dissolved in a solvent, thermosetting resins, sol-gel mixtures, and combinations thereof. The compositions may also include combinations containing dissimilar materials added to impart a desired electrical, structural, or other functional characteristic to the material. One presently preferred pore-filling liquid material comprises a hot melt adhesive that exhibits a high adhesion to the material in previously or subsequently deposited layers.

Advantages of the Invention

The process and apparatus of this invention have several features, no single one of which is solely responsible for its desirable attributes. Without limiting the scope of this invention as expressed by the claims which follow, its more prominent features will now be discussed briefly. After considering this brief discussion, and particularly after reading the section entitled "DESCRIPTION OF THE PREFERRED EMBODIMENTS" one will understand how the features of this invention offer its advantages, which include:

(1) The present invention provides a unique and novel method for producing a three-dimensional object on a layer-by-layer basis under the control of a computer. This method does not require the utilization of a pre-shaped mold or tooling.

(2) Most of the layer manufacturing methods, including powder-based techniques such as 3-D printing (3D–P) and selective laser sintering (SLS), are normally limited to the fabrication of an object with a uniform material composition. The non-porous solid layer lamination technique disclosed in U.S. Pat. No. 5,183,598 (Feb. 2, 1993 to J–L Helle, et al.) suffers the same drawback. In contrast, the presently invented method with a plurality of discharge orifices readily allows the fabrication of a part having a spatially controlled material composition comprising two or more distinct types of pore-filling materials. This method offers an opportunity to impart desirable material composition patterns to an object, making it possible to produce functional materials including functionally gradient composites.

(3) The presently invented method provides a computer-controlled process which places minimal constraint on the variety of materials that can be processed. In the present method, the pore-filling materials may be selected from a broad array of materials including various organic and inorganic substances and their mixtures.

(4) The present method provides an adaptive layer-slicing approach and a thickness sensor to allow for in-process correction of any layer thickness variation (discussed later). The present invention, therefore, offers a preferred method of layer manufacturing when part accuracy is a desirable feature.

(5) The method can be embodied using simple and inexpensive mechanisms, so that the fabricator apparatus can be relatively small, light, inexpensive and easy to maintain.

(6) In the present method, a support structure naturally exists when a new preform layer is fed onto a preceding layer. No additional tool is needed to build a support structure. This is in contrast to most of the prior-art layer-additive techniques that require a separate tool to build a support structure also layer by layer, thereby slowing down the part-building process. Furthermore, with a 50% porosity level in a layer, the remaining 50% is already in a solid state. The dispensing devices only have to dispense the pore-filling materials to fill up to 50% of the layer volume, resulting in a further time saving by a factor of two.

(7) In contrast to other layer-subtractive techniques (e.g., LOM) in which the removal of excess materials used as a support structure is difficult to accomplish, the present method readily allows for easy removal of the support structure; e.g., by simply immersing the unitary 3-D body to a water bath or heating the body to a temperature slightly higher than the melting point of the glue or adhesive material in the support structure.

DESCRIPTION OF THE PREFERRED EMBODIMENTS

Figure 1:
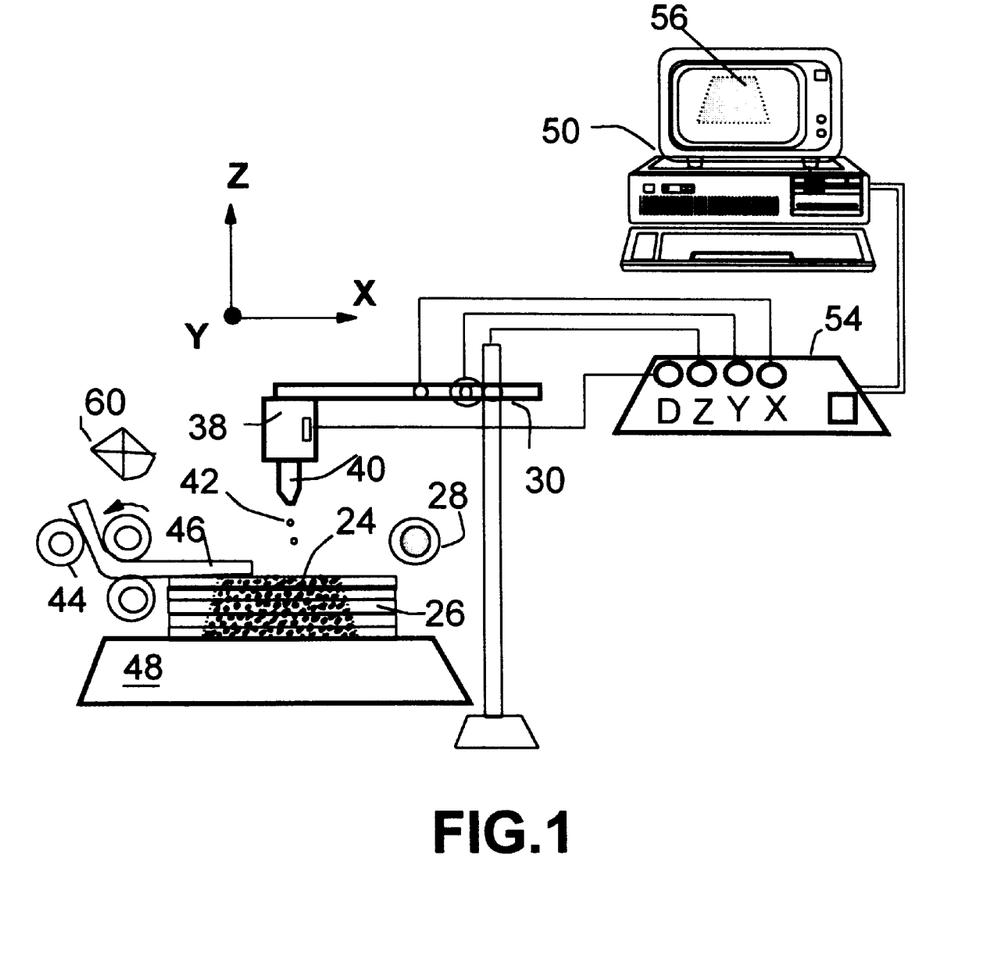
FIG. 1 Schematic of an apparatus for building a 3-D object on a layer-by-layer basis, comprising a preform layer feeding device, material dispensing devices, an object-supporting work surface capable of moving in an X–Y plane and in an orthogonal Z-axis in a desired sequence, a computer control system, and an optional layer-consolidating device (e.g., a heated roller).

FIG. 1 illustrates one embodiment of the apparatus in this invention for making a three-dimensional object. This apparatus is equipped with a computer 50 for creating a drawing or geometry 56 of an object and, through a hardware controller 54 (including signal generator, amplifier, and other needed functional parts) for controlling the operation of other components of the apparatus. One of these components is a material dispensing device 38 with a nozzle 40 which may contain one or a plurality of discharge orifices. The nozzle 40 discharges liquid droplets (e.g., 42) or strands of pore-filling materials onto the surface of a porous preform, allowing these materials to migrate into pores in predefined areas (referred to as positive region) of a preform. These materials do not have to completely fill up the pores in the positive region if the resulting 3-D object is used only as a concept model or prototype. These material only need to coat, cover, protect, or otherwise harden the underlying preform material. To further increase the mechanical integrity of the object, it would be preferred to substantially fill up the pores in the positive region. More than one dispensing device each with one or a multiplicity of nozzles may be used.

Other components of the apparatus include a porous-solid preform feeder 44, an object-supporting work surface 48, an optional layer-consolidating or compacting device (e.g., a heated roller 28), an optional dimension sensor (60), optional temperature-regulating means (not shown) and pump means (not shown) to control the atmosphere of a zone surrounding the work surface where a part 24 is being built, and a three dimensional movement system (30) to position the work surface 48 with respect to the material dispensing device in a direction on an X–Y plane and in a Z-direction as defined by the rectangular coordinate system shown in FIG. 1.

Material Dispensing Devices

There are a broad array of pore-filling material dispensing tools that can be incorporated in the presently invented apparatus. One type of dispensing tool is a thermal ink jet print-head commonly used in a bubble-jet printer. A device of this type operates by using thermal energy selectively produced by resistors located in capillary filled ink channels near channel terminating orifices to vaporize momentarily the "ink" (in the present case, a liquid containing a binder adhesive) and form bubbles on demand. Each temporary bubble expels an ink droplet and propels it toward the object platform.

Another useful liquid material dispensing tool is a piezoelectric activated ink jet print-head that uses a pulse generator to provide an electric signal. The signal is applied across piezoelectric crystal plates, one of which contracts and the other of which expands, thereby causing the plate assembly to deflect toward a pressure chamber. This causes a decrease in volume which imparts sufficient kinetic energy to the liquid in the print-head nozzle so that one liquid droplet is ejected through an orifice. Again, piezoelectric activated ink jet print-heads are commonly found in desk-top color printers.

Preferably, a portion of the material dispensing tool is provided with temperature-controlling means (not shown) to ensure that the material remains in a flowable state while residing in a reservoir, pipe, or channel of the dispensing device prior to being dispensed. Heating and cooling means (e.g., heating elements, cooling coils, thermocouple, and temperature controller; not shown) may be provided to a region surrounding the work surface 48 to control the hardening behavior of the pore-filling material in a preform layer.

There are many commercially available metering and dispensing devices that are capable of depositing various resins such as epoxy, unsaturated polyester, polyurethane, and hot melt adhesives. Examples include various two-component dispensing devices such as PosiDot$^R$ from Liquid Control Corp. (7576 Freedom Ave., North Canton, Ohio) and Series 1125 Meter-Mix-Dispense systems from Ashby-Cross Company, Inc. (418 Boston Street, Topsfield, Mass.). Any of such prior art dispensing nozzles can be incorporated as a part of the presently invented apparatus to deposit a resin-based pore-filling materials. Dispensing devices may also be selected from the group consisting of paint-delivery device, adhesive dispenser, air gun with compressed air-powered actuator means, gear pump, positive displacement pump, metering pump, extrusion screw, solenoid valve, and thermal sprayer.

Porous Solid Preforms and Preform Feeder

Figure 2:
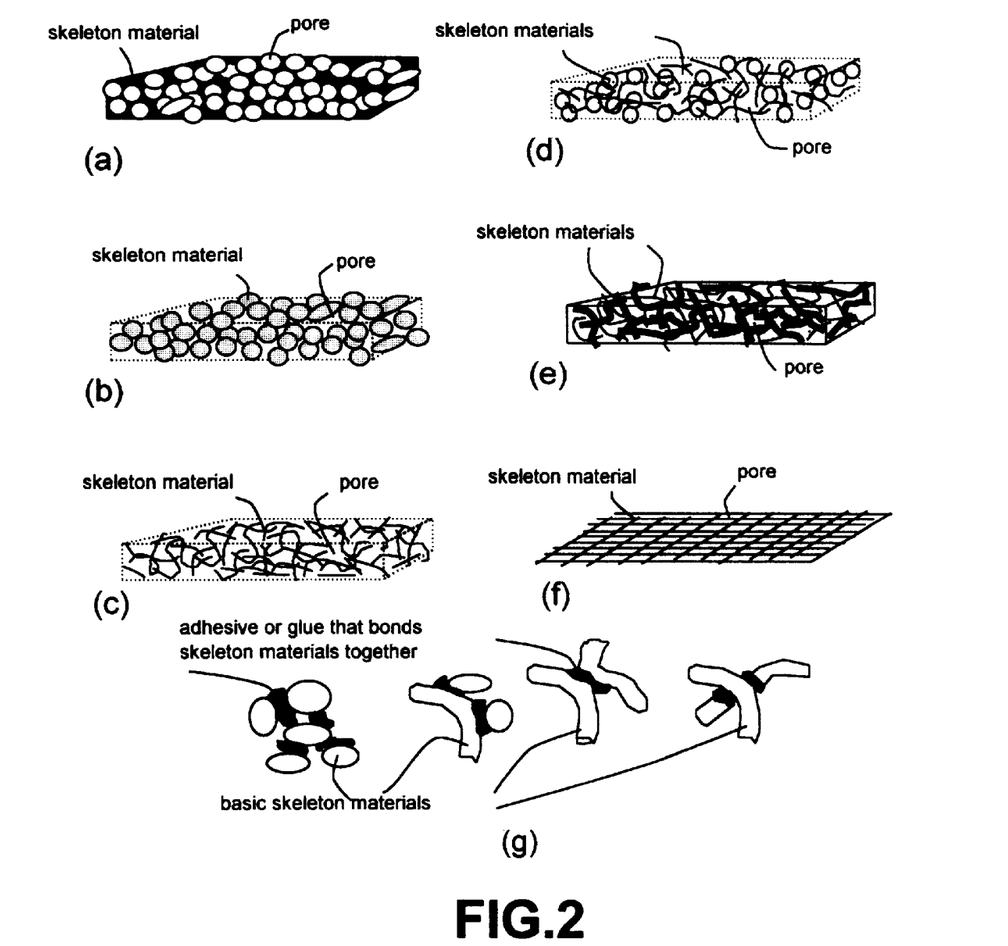
FIG. 2 Examples showing material combinations for porous solid preforms.

A wide array of porous solid preform layers may be used in the present freeform fabrication method and apparatus. Shown in FIG. 2 are several examples of the compositions for a preform. Each preform is basically composed of a skeleton structure and the pores. The pore sizes are preferably on the magnitude of micron ($\mu$m), but could be as high as millimeter (mm) or as low as nanometers (nm). The pore proportion or porosity level is preferably between 30% and 70%, further preferably between 40% and 60%, and most preferably in the vicinity of 50%. FIG. 2a shows a thin plastic film containing a distribution of pores. Methods of producing porous films, membranes, and papers are well-known in the prior art. These include film extrusion or casting followed by solvent extraction, combined casting and foaming, and various paper-making techniques. The plastic skeleton in this film is preferably either a water-soluble polymer or a low-melting polymer. Low-melting polymers include various wax materials, linear polyurethane, polyethylene oxide, and polyethylene glycol, etc. A great variety of water-soluble polymers are readily available, including:

(1) Addition polymerization type: polyvinyl alcohol, polyacrylic acid, polymethyl acrylic acid, maleic anhydride, polyethylene oxide, polyethylene glycol, polyvinyl pyrrolidone, and polyacrylamide;

(2) Condensation polymerization type: Low molecular weight versions of epoxy, linear polyurethane, selected phenolic, amino, and alkyd resins.

FIGS. 2b–2f show that a preform skeleton may be composed of one or more than one type of fiber and/or particulate components. As indicated in FIG. 2g, these reinforcement components may be bonded together at least at points of contact by an adhesive or glue to make a rigid solid preform that can be handled by a preform feeder. This glue may be selected from the above-mentioned water-soluble polymers or low-melting polymers. In the positive region of a layer, the preform skeleton is covered, coated, or protected by the hardened, cured, or solidified pore-filling materials. This portion of a preform layer will not be soluble in water when the unitary body is immersed in a water bath at the end of the build process for removing the support structure. In contrast, a water-soluble glue in the negative region (e.g., 26 in FIG. 1) of a layer will be dissolved in water, allowing the support structure to readily collapse and thereby protruding out the desired 3-D object. In the case of using a low-melting adhesive material to glue together the reinforcement components, the support structure may be collapsed by simply heating the unitary body to a temperature slightly above the melting point of this adhesive. The hardened, cured, or solidified pore-filling material, with a melting point and degradation temperature higher than this support-collapsing temperature will protect the positive region of a layer from getting melted. This positive region of a layer is a part or section of the 3-D object.

The reinforcement components may be selected from the group consisting of short fiber, long fiber, whisker, spherical particle, ellipsoidal particle, flake, small platelet, small ribbon, disc, particulate of any other shape, or a combination thereof. Reinforcement component materials in the present invention can be polymeric, ceramic, metallic, etc. They can be supplied in a wide variety of forms, including continuous fiber tows or monofilaments to form a screen (e.g., FIG. 2f).

Thin film or paper feeders are well known in the art. A convenient and reliable way of feeding preform layers one sheet at a time is using a mechanism involving motor-driven rollers that are commonly used in a copier, fax machine, graphic plotter, or desk-top printer.

Pore-filling Materials

Many types of materials can be selected for use as a pore-filling material. A fast-curing thermosetting resin (e.g., a two-part epoxy) may be maintained in an oligomer state prior to being discharged from a dispensing device. As soon as being dispensed, the resin will migrate into pores and rapidly gel to an extent that the glass transition temperature of this reacting resin quickly approaches or exceeds the work surface environment temperature, thereby solidifying the resin. The gelation process of selected resins, e.g., some photo curable epoxy resins commonly used in stereo lithography, may be further accelerated by simply heating the deposited resin or exposing the resin to an ultraviolet (UV) light, UV-based laser beam, Gamma ray, electron beam, ion beam, laser beam, and/or plasma if deemed necessary. Fast curing resins are well known in the art and several formulations are commercially available.

Any thermoplastic melt that has a sufficiently low viscosity and good chemical compatibility with the preform can be used as a pore-filling material. The liquid pore-filling material compositions do not have to be in a melt state. A solvent-soluble material may be allowed to mix with a predetermined amount of solvent to form a fluent solution or paste. The solution may be allowed to penetrate into pores with the solvent rapidly removed. A fast vaporizing solvent like alcohol or acetone is preferred.

A sol-gel material (e.g., a polymer gel composed of a lightly cross-linked network of chains with small molecules occupying interstices between these chains) can be formulated to have proper flowability prior to being discharged from a nozzle of a dispensing device. The gelation process of the material when brought in contact with a preform layer may be rapidly advanced further to increase its viscosity to facilitate solidification. A ceramic precursor gel, after being deposited into pores, may then be converted to become ceramic, thereby rigidizing the preform layer.

The porous preform layers may be made to contain a hardenable ingredient (e.g., an epoxy resin) and the pore-filling material comprises a chemical composition (e.g., a curing agent) which reacts with this ingredient to form a solid product (e.g., a cross-linked or cured resin) for hardening the preform layers. A wide range of such two-part resins are available commercially.

Layer-consolidating or Compacting Device

Thermosetting resin-based pore-filling materials can be cured by using a variety of energy sources other than heat. These include, but are not limited to, visible light, ultraviolet (UV), Gamma radiation, electron beam, ion beam, laser beam, plasma, etc. These energy sources and heat may be used separately or in combination. Fast-reacting UV-curable resins are particularly advantageous for use in the present invention to rigidize the preform. Non-laser based UV curing equipment and UV-curable adhesives are readily available commercially. Although not required, any of these energy sources may be optionally used to advance the cure chemistry of the resin once dispensed into pores of a preform. Such an energy source may be considered as an optional part of a consolidating means used in the present invention.

In addition, a compaction effector such as a doctor's blade, a roller, or a flat platen may be used to facilitate compaction of preform layers after each layer or a selected number of layers are fed to the build zone above the work surface. Once this compaction procedure is completed, the compaction effector is retreated (compression force being released). A heated roller is particularly useful if a thermosetting resin or a hot melt adhesive is used as a pore-filling material. The compaction effector may be regulated by the motion controller and the computer.

Object-supporting Work Surface

Referring again to FIG. 1, the work surface 48 is located in close, working proximity to the dispensing devices. This work surface preferably has a flat region sufficiently large to accommodate at least the first few layers of the deposited material. The work surface 48 and the material dispensing devices are equipped with mechanical drive means for moving the work surface relative to the dispensing devices in three dimensions along the X-, Y-, and Z-axes in a rectangular coordinate system in a predetermined sequence and pattern, and for displacing the work surface a predetermined incremental distance relative to the dispensing devices. This can be accomplished, for instance, by allowing the dispensing devices to be driven by at least two linear motion devices, which are powered by corresponding stepper or servo motors to provide movements along at least the X- and Y-directions, respectively. Preferably the dispensing devices are also allowed to move up and down in the Z-direction. The work surface may be allowed to move downward by one layer thickness to receive a new layer 46 from the preform feeder 44. This would also allow the compactor 28 to be approximately at the same level as the surface of the new preform layer. Motor means are preferably high resolution reversible stepper motors, although other types of drive motors may be used, including linear motors, servo motors, synchronous motors, D.C. motors, and fluid motors. Mechanical drive means including linear motion devices, motors, and gantry type positioning stages are well known in the art. It will be understood that movement in the X–Y plane need not be limited to movement in orthogonal directions, but may include movement in radial, tangential, arcuate and other directions in the X–Y plane.

These movements will make it possible for the preform feeder to feed successive preform layers and for the dispensing devices to deposit pore-filling materials, thereby forming multiple layers of materials of predetermined thicknesses, which build up on one another sequentially. The rate at which the liquid droplets are discharged from the discharge orifice of a dispensing device onto the work surface is dictated by, for instance, the frequency of the piezo-electric pulses and the orifice size. This rate can be adjusted, by varying the pulse signal generating speed, to meet the possible needs of variable rate at which the nozzle moves with respect to the work surface.

Sensor means (e.g., 60) may be attached to proper spots of the work surface or the material dispensing devices to monitor the dimensions of the physical layers being deposited. The data obtained are fed back periodically to the computer for re-calculating new layer data. This option provides an opportunity to detect and rectify potential layer variations; such errors may otherwise cumulate during the build process, leading to some part inaccuracy. Many prior art dimension sensors may be selected for use in the present apparatus.

Mathematical Modeling and Creation of Logical Layers

Figure 3:
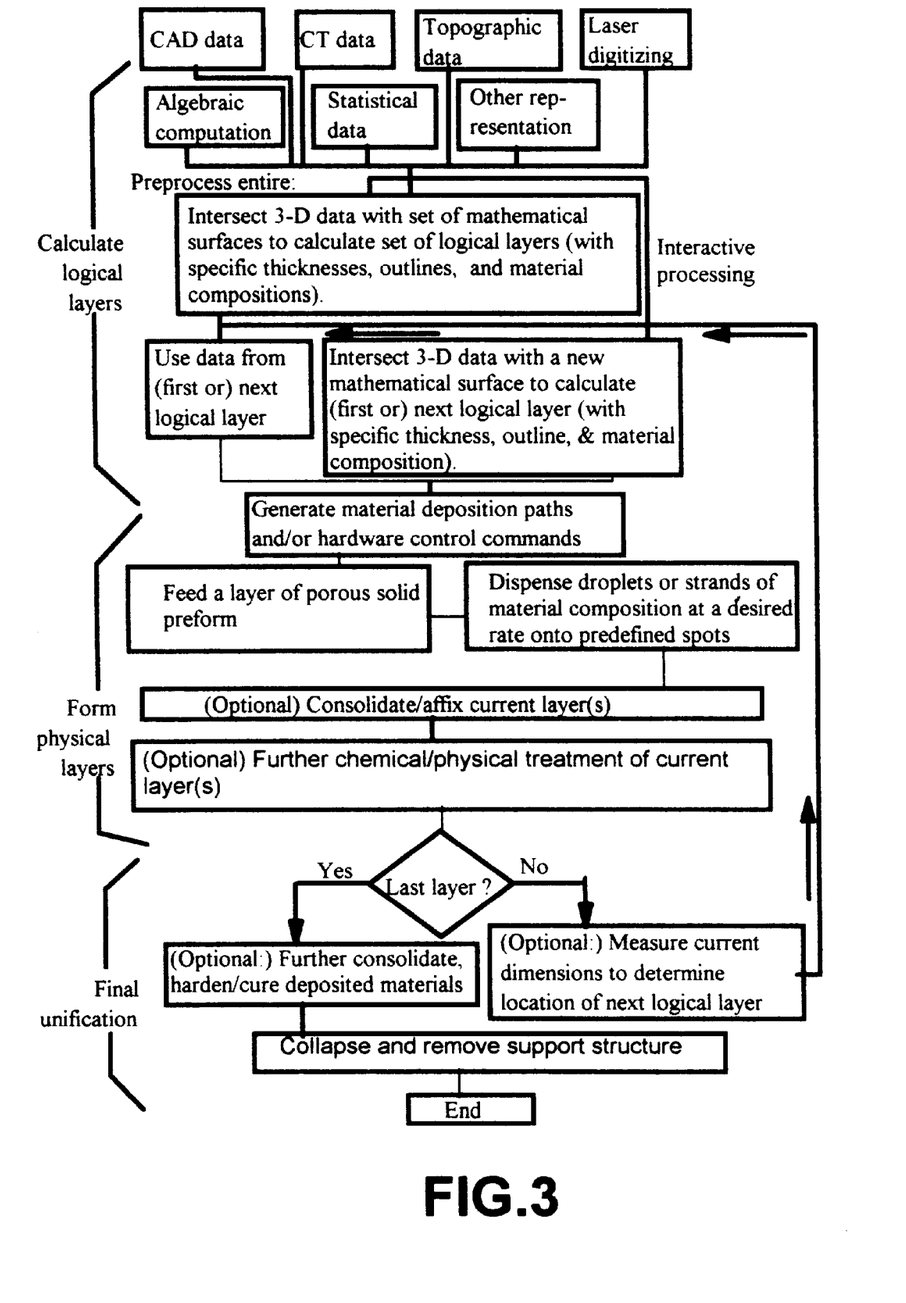
FIG. 3 Flow chart indicating a preferred process that involves using a computer and required software programs for adaptively slicing the geometry of an object into layer data and for controlling various components of the 3-D object building apparatus.

A preferred embodiment of the present invention is a solid freeform fabrication method in which the execution of various steps may be illustrated by the flow chart of FIG. 3. The method begins with the creation of a mathematical model (e.g., via computer-aided design, CAD), which is a data representation of a 3-D object. This model is stored as a set of numerical representations of layers which, together, represent the whole object. A series of data packages, each data package corresponding to the physical dimensions of an individual layer of deposited materials, is stored in the memory of a computer in a logical sequence so that the data packages correspond to individual layers of the materials stacked together to form the object.

Specifically, before the constituent layers of a 3-D object are formed, the geometry of this object is logically divided into a sequence of mutually adjacent theoretical layers, with each theoretical layer defined by a thickness and a set of closed, nonintersecting curves lying in a smooth two-dimensional (2-D) surface. These theoretical layers, which exist only as data packages in the memory of the computer, are referred to as "logical layers." This set of curves forms the "contour" of a logical layer or "cross section". In the simplest situations, each 2-D logical layer is a plane so that each layer is flat, and the thickness is the same throughout any particular layer.

As summarized in the top portion of FIG. 3, the data packages for the logical layers may be created by any of the following methods:

(1) For a 3-D computer-aided design (CAD) model, by logically "slicing" the data representing the model,
(2) For topographic data, by directly representing the contours of the terrain,
(3) For a geometrical model, by representing successive curves which solve "z=constant" for the desired geometry in an x-y-z rectangular coordinate system, and
(4) Other methods appropriate to data obtained by computer tomography (CT), magnetic resonance imaging (MRI), satellite reconnaissance, laser digitizing, line ranging, or other methods of obtaining a computerized representation of a 3-D object.

An alternative to calculating all of the logical layers in advance is to use sensor means to periodically measure the dimensions of the growing object as new layers are formed, and to use the acquired data to help in the determination of where each new logical layer of the object should be, and possibly what the thickness of each new layer should be. This approach, called "adaptive layer slicing", could result in more accurate final dimensions of the fabricated object because the actual thickness of a sequence of stacked layers may be different from the simple sum of the intended thicknesses of the individual layers.

The closed, nonintersecting curves that are part of the representation of each layer unambiguously divide a smooth two-dimensional surface into two distinct regions. In the present context, a "region" does not mean a single, connected area. Each region may consist of several island-like subregions that do not touch each other. One of these regions is the intersection of the surface with the desired 3-D object, and is called the "positive region" of the layer. The other region is the portion of the surface that does not intersect the desired object, and is called the "negative region." The curves are the boundary between the positive and negative regions, and are called the "outline" of the layer. In the present context, the pore-filling materials are allowed to be deposited in the "positive region" while no pore-filling material may be deposited in the "negative region" in each layer that serves as a support structure.

A preferred embodiment of the present invention contains material dispensing devices, a preform feeder, an object-supporting platform or work surface, and motion devices that are regulated by a computer-aided design (CAD) computer and a machine controller. For example, as schematically shown in FIG. 1, the CAD computer with its supporting software programs operates to create a three-dimensional image of a desired object 56 or model and to convert the image into multiple elevation layer data, each layer being composed of a plurality of segments or data points.

As a specific example, the geometry of a three-dimensional object 56 may be converted into a proper format utilizing commercially available CAD/Solid Modeling software. A commonly used format is the stereo lithography file (.STL), which has become a defacto industry standard for rapid prototyping. The object image data may be sectioned into multiple layers by a commercially available software program. Each layer has its own shape and dimensions. These layers, each being composed of a plurality of segments or collection of data points, when combined together, will reproduce the complete shape of the intended object. In general, when a multi-material object is desired, these segments or data points may be coded with proper material compositions. In particular, when a colorful object is desired, these segments or data points are preferably sorted in accordance with their colors. This can be accomplished by taking the following procedure:

When the stereo lithography (.STL) format is utilized, the geometry is represented by a large number of triangular facets that are connected to simulate the exterior and interior surfaces of the object. The triangles may be so chosen that each triangle covers one and only one material composition (or one color). In a conventional .STL file, each triangular facet is represented by three vertex points each having three coordinate points, $(x_1,y_1,z_1)$, $(x_2,y_2,z_2)$ and $(x_3,y_3,z_3)$, and a unit normal vector $(i,j,k)$. Each facet is now further endowed with a material composition code to specify the desired reinforcement type and adhesive. This geometry representation of the object is then sliced into a desired number of layers expressed in terms of any desired layer interface format (such as Common Layer Interface or CLI format). During the slicing step, neighboring data points with the same material composition code on the same layer may be sorted together. These segment data in individual layers are then converted into programmed signals (data for selecting dispensing devices and tool paths) in a proper format, such as the standard CNC G-codes and M-codes commonly used in computerized numerical control (CNC) machinery industry. These layering data signals may be directed to a machine controller which selectively actuates the motors for moving the material dispensing device with respect to the object-supporting work surface, activates signal generators, drives the liquid dispensing tool, drives the optional vacuum pump means, and operates optional temperature controllers, etc. It should be noted that although .STL file format has been discussed in this paragraph, many other file formats have been employed in different commercial rapid prototyping and manufacturing systems. These file formats may be used in the presently invented system and each of the constituent segments for the object geometry may be assigned a material composition code if an object of different material compositions at different portions is desired.

The three-dimensional motion controller is electronically linked to the mechanical drive means and is operative to actuate the mechanical drive means in response to "X", "Y", "Z" axis drive signals for each layer received from the CAD computer. Controllers that are capable of driving linear motion devices are commonplace. Examples include those commonly used in a milling machine.

Numerous software programs have become available that are capable of performing the presently specified functions. Suppliers of CAD/Solid Modeling software packages for converting CAD drawings into .STL format include SDRC (Structural Dynamics Research Corp. 2000 Eastman Drive, Milford, Ohio 45150), Cimatron Technologies (3190 Harvester Road, Suite 200, Burlington, Ontario L7N 3N8, Canada), Parametric Technology Corp. (128 Technology Drive, Waltham, Mass. 02154), and Solid Works (150 Baker Ave. Ext., Concord, Mass. 01742). Optional software packages may be utilized to check and repair .STL files which are known to often have gaps, defects, etc. AUTOLISP can be used to convert AUTOCAD drawings into multiple layers of specific patterns and dimensions.

Several software packages specifically written for rapid prototyping have become commercially available. These include (1) SOLIDVIEW RP/MASTER software from Solid Concepts, Inc., Valencia, Calif.; (2) MAGICS RP software from Materialise, Inc., Belgium; and (3) RAPID PROTOTYPING MODULE (RPM) software from Imageware, Ann Arbor, Mich.

These packages are capable of accepting, checking, repairing, displaying, and slicing .STL files for use in a solid freeform fabrication system. MAGICS RP is also capable of performing layer slicing and converting object data into directly useful formats such as Common Layer Interface (CLI). A CLI file normally comprises many "polylines" with each polyline being an ordered collection of numerous line segments.

A company named CGI (Capture Geometry Inside, currently located at 15161 Technology Drive, Minneapolis, Minn.) provides capabilities of digitizing complete geometry of a three-dimensional object. Digitized data may also be obtained from computed tomography (CT) and magnetic resonance imaging (MRI), etc. These digitizing techniques are known in the art. The digitized data may be re-constructed to form a 3-D model on the computer and then converted to .STL files. Available software packages for computer-aided machining include NC Polaris, Smartcam, Mastercam, and EUCLID MACHINIST from MATRA Datavision (1 Tech Drive, Andover, Mass. 01810).

Formation of the Physical Layers

The data packages are stored in the memory of a computer, which controls the operation of an automated fabricator comprising a preform feeder, material dispensing devices, a work surface, layer-consolidating devices, optional dimension sensors, and motion devices. Using these data packages, the computer controls the automated fabricator to manipulate the fabrication materials (preform layers and pore-filling materials) to form individual layers of materials in accordance with the specifications of an individual data package. The liquid pore-filling material compositions used to fill the pores in a preform layer preferably have the property that they can be readily hardened, solidified, or cured. In one embodiment of the invention, the liquid pore-filling materials preferably have the further property that the contours of the fabrication materials when brought into contact bond to each other so that individual layers can be readily unified.

The pore-filling materials do not have to be homogeneous. They may, for example, exhibit variations in composition based upon the structural or physical requirements of the desired object being built. These variations may serve to accomplish internal variations of the physical properties of the object, such as hardness, mass density, and coefficient of thermal expansion and variations of external appearance such as color patterns. In one preferred embodiment, the solid reinforcement components may be deposited to comprise a spatially controlled material composition comprising two or more distinct types of reinforcement materials. In another specific embodiment, the pore-filling materials may be deposited in continuously varying concentrations of distinct types of materials. These material composition variations can be readily accomplished by operating the presently discussed dispensing devices.

If composition variation of pore-filling materials is desired within any particular layer, and if the mechanism for dispensing materials has the capability of depositing the required various compositions automatically, then the variation in composition may be represented mathematically within the data package for each layer, and the mathematical representation may be used to control the composition of materials deposited. However, if the mechanism for depositing a material is limited to providing layers of any one specific composition at a time, then variations in composition may be accomplished by logically separating a particular layer into sub-layers, where each sub-layer is composed of a different material, and the union of the sub-layers is equal to the particular layer. Each sub-layer is then treated as a distinct layer in the deposition process, and the complete layer is formed by the formation and bonding of a succession of its constituent sub-layers.

Referring to FIG. 3, therefore, as another embodiment of the present invention, a solid freeform fabrication method may comprise the steps of:

(a) setting up a work surface that lies substantially parallel to an X–Y plane of an X-Y-Z Cartesian coordinate system;

(b) operating a preform feeder for feeding a first porous solid preform layer to the work surface;

(c) using dispensing devices to dispense a first pore-filling material onto predetermined areas (positive region) of the first porous preform layer to at least partially fill in the pores in this region for the purpose of hardening and forming the first section of the 3-D object; the operation of hardening acting to not only enhance the strength of the preform in the positive region, but also protect this portion of the preform layer from getting disintegrated during the final support-collapsing operation described in step (g).

(d) feeding a second porous preform layer onto the first layer, dispensing a second pore-filling material onto predetermined areas (positive region) of the second layer to harden this region for forming the second section of the 3-D object; this second pore-filling material being the same as or different from the first pore-filling material;

(e) repeating the operations from (b) to (d) to stack up and build successive preform layers along the Z-direction of the X-Y-Z coordinate system for forming multiple layers of the object with the remaining un-hardened areas (negative region) of individual layers staying as a support structure;

(f) providing means to sequentially or simultaneously affix successive layers together to form a unitary body; and (g) removing the support structure by exposing the un-hardened areas of this unitary body to a support-collapsing environment, causing the 3-D object to appear.

In this method, the porous solid preform layers may contain a reinforcement composition selected from the group consisting of short fiber, long fiber, whisker, spherical particle, ellipsoidal particle, flake, small platelet, small ribbon, disc, particulate of any other shape, or a combination thereof. In this method, the porous preform layers preferably comprise a water-soluble material composition and the support-collapsing environment comprises water. In this situation, individual short fibers and/or reinforcement particles may be bonded together at least at their points of contact by a water soluble glue, forming minute pores interspersed with those fibers or particles. These pores may be isolated from each other or interconnected. Some of the pores may provide channels for the dispensed pore-filling liquid materials to migrate from the top to the bottom of a preform layer, thereby promoting bonding between adjacent layers. The otherwise isolated fibers and particles, when glued together, will make a porous solid layer sufficiently rigid to be handled by the preform feeder. In the predetermined areas (positive region), the fibers and particles are coated, covered, or otherwise protected by the deposited pore-filling materials. The material in this positive region will remain essentially intact while the fibers/particles in the support structure or negative region will be separated/isolated due to the glue being dissolved in water. This step will allow the support structure to collapse, thereby revealing the desired 3-D object.

In another embodiment of the present invention, the support structure may be made to contain a material composition with a melting point lower than the melting or decomposition temperature of the hardened areas (positive region). In this case, the unitary body may be subjected to a support-collapsing temperature (Tsc) higher than the melting point of this glue material but lower than either the melting point of a thermoplastic pore-filling material or the degradation temperature of a cured thermoset resin. In this manner, the support-collapsing environment comprises a high temperature environment to melt out the low-melting composition (glue) for readily collapsing the support structure to reveal the 3-D structure.

The operation of using dispensing devices to dispense a pore-filling material onto predetermined areas of a porous preform layer preferably include the steps of (1) positioning the dispensing devices at a predetermined initial distance from the work surface; (2) operating and moving the dispensing devices relative to the work surface along selected directions in the X–Y plane to dispense and deposit the pore-filling material to the predetermined areas; (3) moving the work surface away from the dispensing means along the Z-axis direction by a predetermined layer distance to allow for the feeding and building of a subsequent layer. The movement of the dispensing devices relative to the work surface may be carried out by using any motor-driven linear motion devices, gantry table, or robotic arms which are all widely available commercially.

To facilitate automation of the apparatus used in the presently invented method, the moving and dispensing operations are preferably conducted under the control of a computer and machine controller. This can be accomplished by (1) first creating a geometry (CAD design) of the 3-D object on a computer with the geometry including a plurality of data points defining the object, (2) generating programmed signals corresponding to each of the data points in a predetermined sequence; and (3) moving the dispensing devices and the work surface relative to each other in response to these programmed signals. These signals may be generated in standard formats, such as G-codes and M-codes that are commonly used in computer numerical control (CNC) machinery industry.

In order to produce a multi-material or multi-color 3-D object in which the material composition or color varies from point to point, the presently invented method may further include the steps of (1) creating a geometry of the 3-D object on a computer with the geometry including a plurality of data points defining the object; each of the data points being coded with a selected material composition (possibly including a color code), (2) generating programmed signals corresponding to each of the data points in a predetermined sequence; and (3) operating the dispensing devices in response to the programmed signals to dispense and deposit selected material compositions while the dispensing devices and the work surface are moved relative to each other in response to these programmed signals in the predetermined sequence.

Another embodiment of the present invention is a method for making a three-dimensional object of spatially tailored material compositions under the control of a computer. The method include, in combination, the following steps:

(A) creating a geometry or design of this 3-D object on a computer with this geometry including a plurality of segments defining the object; each of the segments being coded with a specific material composition (including color information when necessary);

(B) generating program signals corresponding to each of these segments for the object in a predetermined sequence;

(C) feeding successive layers of porous solid preform onto a work surface upon which the object is built;

(D) providing dispensing devices that include a plurality of nozzles each with at least one discharge orifice of a predetermined size;

(E) operating the dispensing devices for dispensing at least two pore-filling materials onto the successive preforms each with a predetermined material distribution pattern according to the program signals; the un-deposited portion of a layer staying as the support structure;

(F) during the dispensing step and in response to the programmed signals, moving the dispensing devices and the work surface relative to each other in an X–Y plane and in the Z-direction in a predetermined sequence of movements such that the pore-filling materials are deposited in successive preform layers as a plurality of segments sequentially formed so that the pore-filling materials in the current layer overly at least a portion of the preceding layer in contact therewith to thereby form an integral unitary body;

(G) removing the support structure by exposing the un-deposited areas (negative region) of the unitary body to a support-collapsing environment, causing the 3-D object to appear.

This method just described in the above paragraph was developed because we recognized that popular rapid prototyping or layer manufacturing formats, such as STL and CLI, make use of "segments" as the basic building blocks of a 3-D shape.

What is claimed:

1. A method for fabricating a three-dimensional object from individual porous solid preform layers and at least a pore-filling material, said method comprising:

(a) providing a work surface lying substantially parallel to an X–Y plane of an X-Y-Z Cartesian coordinate system defined by three mutually perpendicular X-, Y- and Z-axes;

(b) feeding a first porous solid preform layer to said work surface;

(c) using dispensing means to dispense a first pore-filling material onto predetermined areas of said first porous preform layer to at least partially fill in the pores in said predetermined areas for the purpose of hardening said areas and forming the first section of said 3-D object;

(d) feeding a second porous preform layer onto said first layer, dispensing a second pore-filling material onto predetermined areas of said second layer for hardening said areas and forming the second section of said 3-D object;

(e) repeating the operations from (b) to (d) to stack up and build successive preform layers along the Z-direction of said X-Y-Z coordinate system for forming multiple layers of said object with the remaining un-hardened areas of individual layers staying as a support structure;

(f) providing means to sequentially or simultaneously affix successive layers together to form a unitary body; and (g) removing said support structure by exposing said un-hardened areas of said unitary body to a support-collapsing environment, causing said 3-D object to appear.

2. A method for fabricating a three-dimensional object as set forth in claim 1, wherein said porous preform layers comprise a water-soluble material composition and said support-collapsing environment comprises water.

3. A method for fabricating a three-dimensional object as set forth in claim 1, wherein said at least one pore-filling material comprises a thermosetting resin which, upon curing, hardens said preform layers.

4. A method for fabricating a three-dimensional object as set forth in claim 1, wherein said at least one pore-filling material comprises a thermoplastic polymer which, upon solidification, hardens said preform layers.

5. A method for fabricating a three-dimensional object as set forth in claim 1, wherein said at least one pore-filling material comprises a polymer-containing solution which, upon solvent removal, hardens said preform layers.

6. A method for fabricating a three-dimensional object as set forth in claim 1, wherein said at least one pore-filling material comprises a chemical composition which reacts with at least one material in said preform layers to form a solid product for hardening said preform layers.

7. A method for fabricating a three-dimensional object as set forth in claim 1, wherein said support structure contains a material composition with a melting point lower than the melting or decomposition temperature of said hardened areas and wherein said support-collapsing environment comprises a higher temperature environment to melt out said low-melting composition for readily collapsing said support structure in said unitary body.

8. A method for fabricating a three-dimensional object as set forth in claim 1, wherein said dispensing means comprise means selected from the group consisting of an inkjet printhead, gear pump, positive displacement pump, air pump, metering pump, extrusion screw, solenoid valve, and thermal sprayer.

9. A method for fabricating a three-dimensional object as set forth in claim 1, wherein said dispensing means comprise multiple nozzles for dispensing a plurality of material compositions.

10. A method for fabricating a three-dimensional object as set forth in claim 1, wherein said feeding of preform layers is accomplished by using a mechanism comprising motor-driven rollers.

11. A method for fabricating a three-dimensional object as set forth in claim 1, wherein said porous solid preform layers comprise a reinforcement composition selected from the group consisting of short fiber, long fiber, whisker, spherical particle, ellipsoidal particle, flake, small platelet, small ribbon, disc, or a combination thereof.

12. A method for fabricating a three-dimensional object as set forth in claim 1, wherein the operation of using dispensing means to dispense a pore-filling material onto predetermined areas of a porous preform layer comprises the steps of:

positioning said dispensing means at a predetermined initial distance from said work surface;

operating and moving said dispensing means relative to said work surface along selected directions in said X–Y plane to dispense and deposit said at least one pore-filling material to said predetermined areas;

moving said dispensing means away from said work surface along said Z-axis direction by a predetermined distance to allow for the feeding and building of a subsequent layer.

13. A method as defined in claim 1, further comprising the steps of:

creating a geometry of said three-dimensional object on a computer with said geometry including a plurality of data points defining the object;

generating programmed signals corresponding to each of said data points in a predetermined sequence; and moving said dispensing means and said work surface relative to each other in response to said programmed signals.

14. A method as defined in claim 1, further comprising the steps of:

creating a geometry of said three-dimensional object on a computer with said geometry including a plurality of data points defining the object; each of said data points being coded with a selected material composition;

generating programmed signals corresponding to each of said data points in a predetermined sequence; and operating said dispensing means in response to said programmed signals to dispense and deposit selected material compositions while said dispensing means and said work surface are moved relative to each other in response to said programmed signals in said predetermined sequence.

15. A method as defined in claim 1, further comprising using dimension sensor means to periodically measure dimensions of the object being built; and using a computer to determine the thickness and outline of individual layers of said porous solid preform and pore-filling materials in accordance with a computer aided design representation of said object; said computing step comprising operating said computer to calculate a first set of logical layers with specific thickness and outline for each layer and then periodically re-calculate another set of logical layers after periodically comparing the dimension data acquired by said sensor means with said computer aided design representation in an adaptive manner.

16. A method as defined in claim 1, further comprising an operation of impregnating said 3-D object with a solidifying liquid material after step (g) in claim 1.

17. A solid freeform fabrication apparatus for making a three-dimensional object from porous solid preform layers, said apparatus comprising:

(a) a work surface to support said object while being built;

(b) a feeder at a predetermined initial distance from said work surface for feeding successive porous solid preform layers onto said work surface one layer at a time;

(c) dispensing means at a predetermined initial distance from said work surface for dispensing at least a pore-filling material onto said porous solid preform layers;

(d) motion devices coupled to said work surface and said dispensing means for moving said dispensing means and said work surface relative to each other in a plane defined by first and second directions and in a third direction orthogonal to said plane to dispense said at least a pore-filling material onto said porous preform layers for forming said 3-D object.

18. Apparatus as set forth in claim 17, wherein said dispensing means comprises a device selected from the group consisting of an ink jet print-head with thermally activated actuator means, an ink jet print-head with piezo-electrically activated actuator means, an air gun with compressed air-powered actuator means, a gear pump, a positive displacement pump, a metering pump, an extrusion screw, a solenoid valve, and a thermal sprayer.

19. Apparatus as set forth in claim 17, further comprising:

a computer-aided design computer and supporting software programs operative to create a three-dimensional geometry of said 3-D object, to convert said geometry into a plurality of data points defining the object, and to generate programmed signals corresponding to each of said data points in a predetermined sequence; and a three-dimensional motion controller electronically linked to said computer and said motion devices and operative to actuate said motion devices in response to said programmed signals for each of said data points received from said computer.

20. Apparatus as set forth in claim 19, further comprising:

sensor means electronically linked to said computer and operative to periodically provide layer dimension data to said computer;

supporting software programs in said computer operative to perform adaptive layer slicing to periodically create a new set of layer data comprising data points defining the object in accordance with said layer dimension data acquired by said sensor means, and to generate programmed signals corresponding to each of said data points in a predetermined sequence.

21. Apparatus as set forth in claim 17, further comprising consolidating means coupled to said motion devices for compacting, hardening, or consolidating said preform layers along with said dispensed pore-filling material.

22. Apparatus as set forth in claim 17 wherein said dispensing means comprises a plurality of nozzles each with at least one discharge orifice of a predetermined size for dispensing said at least one pore-filling material.

23. A method for making a three-dimensional object of spatially tailored material compositions, comprising the steps of creating a geometry of said 3-D object on a computer, said geometry including a plurality of segments defining said object; each of said segments being coded with a specific material composition;

generating program signals corresponding to each of said segments for said object in a predetermined sequence;

feeding successive layers of porous solid preform onto a work surface upon which said object is built;

providing dispensing means comprising a plurality of nozzles each with at least one discharge orifice of a predetermined size;

operating said dispensing means for dispensing at least two pore-filling materials onto said successive preforms each with a predetermined material distribution pattern according to said program signals; the un-deposited portion of a layer staying as a portion of a support structure;

during said dispensing step and in response to said programmed signals, moving said dispensing means and said work surface relative to each other in a plane defined by first and second directions and in a third direction orthogonal to said plane in a predetermined sequence of movements such that said pore-filling materials are deposited in successive preform layers as a plurality of segments sequentially formed so that said pore-filling materials in the current layer overly at least a portion of the preceding layer in contact therewith to thereby form an integral unitary body;

removing said support structure by exposing said un-deposited areas of said unitary body to a support-collapsing environment, causing said 3-D object to appear.

24. A method as set forth in claim 23, further comprising additional step of impregnating or coating said 3-D object with a solidifying material to form a protected 3-D composite part.

25. A method as set forth in claim 23, further comprising additional step of providing consolidating means to further sequentially or simultaneously affix successive layers together to form a unitary body.

* * * * *